United States Patent
Erez et al.

(10) Patent No.: US 9,875,049 B2
(45) Date of Patent: Jan. 23, 2018

(54) MEMORY SYSTEM AND METHOD FOR REDUCING PEAK CURRENT CONSUMPTION

(71) Applicant: SanDisk Technologies Inc., Plano, TX (US)

(72) Inventors: Eran Erez, Bothell, WA (US); Jonathan H. Hsu, Newark, CA (US); Ken Q. Nguyen, Fremont, CA (US)

(73) Assignee: SanDisk Technologies LLC, Plano, TX (US)

( * ) Notice: Subject to any disclaimer, the term of this patent is extended or adjusted under 35 U.S.C. 154(b) by 65 days.

(21) Appl. No.: 14/834,092

(22) Filed: Aug. 24, 2015

(65) Prior Publication Data

US 2017/0060461 A1    Mar. 2, 2017

(51) Int. Cl.
*G06F 12/00* (2006.01)
*G06F 3/06* (2006.01)
*G06F 1/32* (2006.01)

(52) U.S. Cl.
CPC .......... *G06F 3/0625* (2013.01); *G06F 1/3268* (2013.01); *G06F 1/3275* (2013.01); *G06F 1/3296* (2013.01); *G06F 3/064* (2013.01); *G06F 3/0688* (2013.01); *Y02B 60/1228* (2013.01); *Y02B 60/1246* (2013.01); *Y02B 60/1285* (2013.01)

(58) Field of Classification Search
CPC ...... G06F 3/0625; G06F 1/3296; G06F 3/064; G06F 3/0673; G06F 3/0619; G06F 3/0655; G06F 3/0688
See application file for complete search history.

(56) References Cited

U.S. PATENT DOCUMENTS

| | | | | |
|---|---|---|---|---|
| 5,894,579 A * | 4/1999 | Fujihara | ............... | G06F 1/26 708/100 |
| 7,433,993 B2 * | 10/2008 | Sinclair | ............... | G06F 12/0246 711/103 |
| 8,301,826 B2 * | 10/2012 | Gonzalez | ............ | G06F 12/0246 365/230.01 |
| 8,649,240 B2 * | 2/2014 | McCombs | ............... | G11C 8/18 365/194 |
| 8,745,369 B2 * | 6/2014 | Yurzola | ................. | G06F 1/3275 713/100 |
| 8,873,284 B2 * | 10/2014 | Sinclair | ............... | G06F 12/0246 365/185.03 |
| 8,929,170 B2 * | 1/2015 | Park | ......................... | G11C 5/14 365/194 |
| 9,368,214 B2 * | 6/2016 | Kasorla | ................. | G11C 16/10 |

(Continued)

*Primary Examiner* — David X Yi
*Assistant Examiner* — Francisco Grullon
(74) *Attorney, Agent, or Firm* — Brinks Gilson & Lione

(57) ABSTRACT

A memory system and method for reducing peak current consumption. In one embodiment, a method is provided that is performed in a memory system comprising a memory with a plurality of blocks, wherein each block has a peak current consumption. In this method, a plurality of metablocks is created, wherein each metablock is created by grouping together blocks with complementary peak current consumption. Next, the metablocks are programmed. Because each of the metablocks has blocks with complementary peak current consumption, each of the metablocks has similar peak current consumption when programmed. Other embodiments are provided.

35 Claims, 14 Drawing Sheets

(56) References Cited

U.S. PATENT DOCUMENTS

| | | | |
|---|---|---|---|
| 9,400,713 B2* | 7/2016 | Gorobets | G11C 29/52 |
| 9,455,048 B2* | 9/2016 | Berckmann | G11C 29/88 |
| 2005/0289367 A1* | 12/2005 | Clark | G06F 1/26 |
| | | | 713/300 |
| 2010/0036998 A1* | 2/2010 | Ben-Rubi | G06F 3/0625 |
| | | | 711/100 |
| 2011/0173462 A1* | 7/2011 | Wakrat | G06F 1/26 |
| | | | 713/300 |
| 2014/0075133 A1* | 3/2014 | Li | G06F 12/00 |
| | | | 711/154 |
| 2015/0098272 A1* | 4/2015 | Kasorla | G11C 16/10 |
| | | | 365/185.11 |
| 2016/0077961 A1* | 3/2016 | Erez | G06F 3/0625 |
| | | | 711/103 |
| 2016/0231957 A1* | 8/2016 | Erez | G06F 3/0625 |

\* cited by examiner

MEMORY SYSTEM AND METHOD FOR REDUCING PEAK CURRENT CONSUMPTION

BACKGROUND

Some memory systems, such as solid-state drives (SSDs), contain one or more memory dies having blocks of memory that can be read or written in parallel. Memory systems typically have a maximum power threshold, which may limit the number of operations that can be executed at any given time and/or the number of dies that can be used at any given time. One way to attempt to avoid exceeding the maximum power threshold is to program the memory "softly" (e.g., using a "B2h command"), so the memory charges at a lower level to generate lower current peaks. However, this generally results in lower performance of the memory system and increase bit rate errors.

DETAILED DESCRIPTION

Overview

Figure 1A:
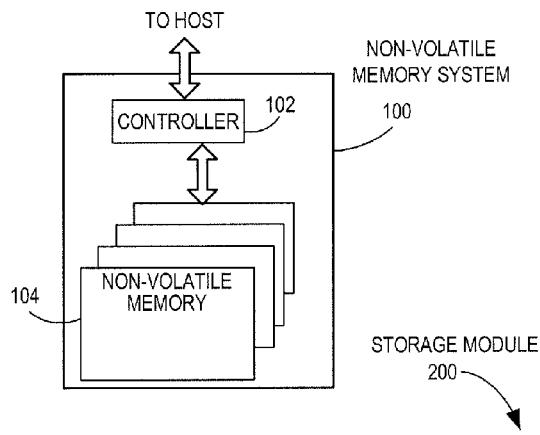
FIG. 1A is a block diagram of a non-volatile memory system of an embodiment.

By way of introduction, the below embodiments relate to a memory system and method for reducing peak current consumption. In one embodiment, a method is provided that is performed in a memory system comprising a memory with a plurality of blocks, wherein each block has a peak current consumption. In this method, a plurality of metablocks is created, wherein each metablock is created by grouping together blocks with complementary peak current consumption. Next, the metablocks are programmed, wherein the blocks grouped together in a metablock are programmed in parallel. Because each of the metablocks has blocks with complementary peak current consumption, each of the metablocks has similar peak current consumption when programmed.

In some embodiments, the memory comprises a plurality of single-plane memory dies, and wherein a metablock is created by grouping together a block from each of the memory dies.

In some embodiments, the memory comprises a multi-plane memory die, and a metablock is created by grouping together a block from each of the planes.

In some embodiments, the memory comprises a plurality of multi-plane memory dies, and a metablock is created by grouping together a block from each of the planes.

In some embodiments, a metablock is created by grouping together blocks with complementary memory addresses.

In some embodiments, a metablock is created by grouping together blocks using an offset address.

In some embodiments, a metablock is created by grouping together blocks using a look-up table.

In some embodiments, for at least one metablock, the blocks grouped together in the metablock are in different relative locations in their respective planes or dies.

In another embodiment, a method is provided that is performed in a memory system comprising a memory with a plurality of blocks, each block having a plurality of word lines, wherein each word line has a peak current consumption. In this method, a plurality of metawordlines is created, wherein each metawordline is created by grouping together word lines with complementary peak current consumption. The metawordlines are programmed. Because each of the metawordlines has word lines with complementary peak current consumption, each of the metawordlines has similar peak current consumption when programmed.

In some embodiments, the memory comprises a plurality of single-plane memory dies, and a metawordline is created by grouping together a word line from each of the memory dies.

In some embodiments, the memory comprises a multi-plane memory die, and a metawordline is created by grouping together a word line from each of the planes.

In some embodiments, the memory comprises a plurality of multi-plane memory dies, and a metawordline is created by grouping together a word line from each of the planes.

In some embodiments, a metawordline is created by grouping together word lines with complementary memory addresses.

In some embodiments, a metawordline is created by grouping together word lines using an offset address.

In some embodiments, a metawordline is created by grouping together word lines using a look-up table.

In some embodiments, for at least one metawordline, the word lines grouped together in the metawordline are in different relative locations in their respective planes or dies.

In another embodiment, a memory system is provided comprising a memory having a plurality of blocks, wherein each block has a plurality of word lines and a controller. The controller is configured to perform at least one of the following: create a plurality of sets of blocks that will have similar peak current consumption when programmed in parallel by grouping together blocks with complementary peak current consumption; and creating a plurality of metawordlines that will have similar peak current consumption by grouping together word lines with complementary peak current consumption.

In some embodiments, the memory is a three-dimensional memory. Also, in some embodiments, the memory system is embedded in a host, while, in other embodiments, the memory system is removably connected to a host.

Other embodiments are possible, and each of the embodiments can be used alone or together in combination. Accordingly, various embodiments will now be described with reference to the attached drawings.

Exemplary Embodiments

Figure 1B:
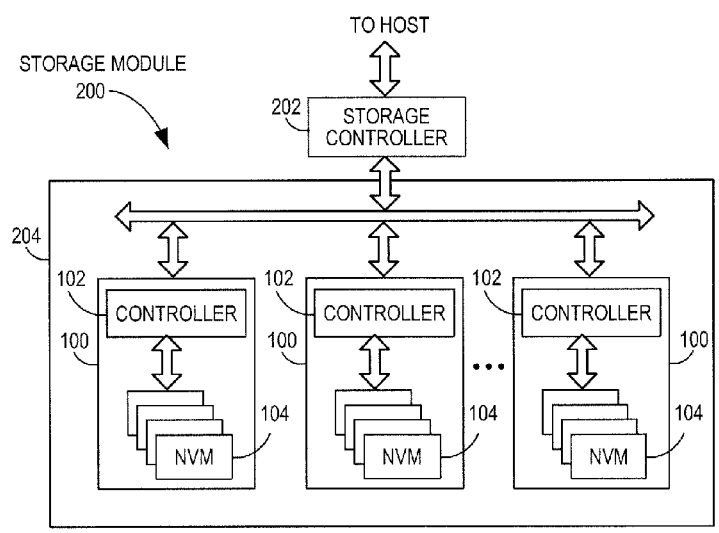
FIG. 1B is a block diagram illustrating an exemplary storage module of an embodiment.
Figure 1C:
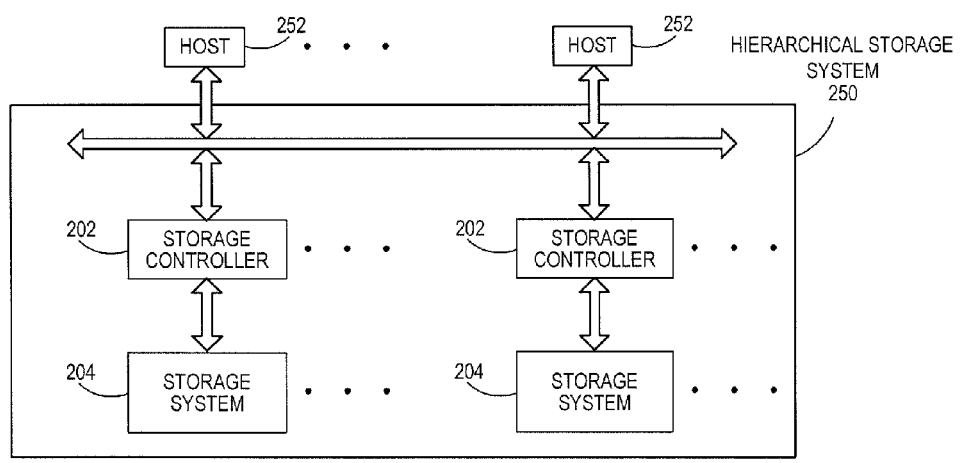
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system 100 according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
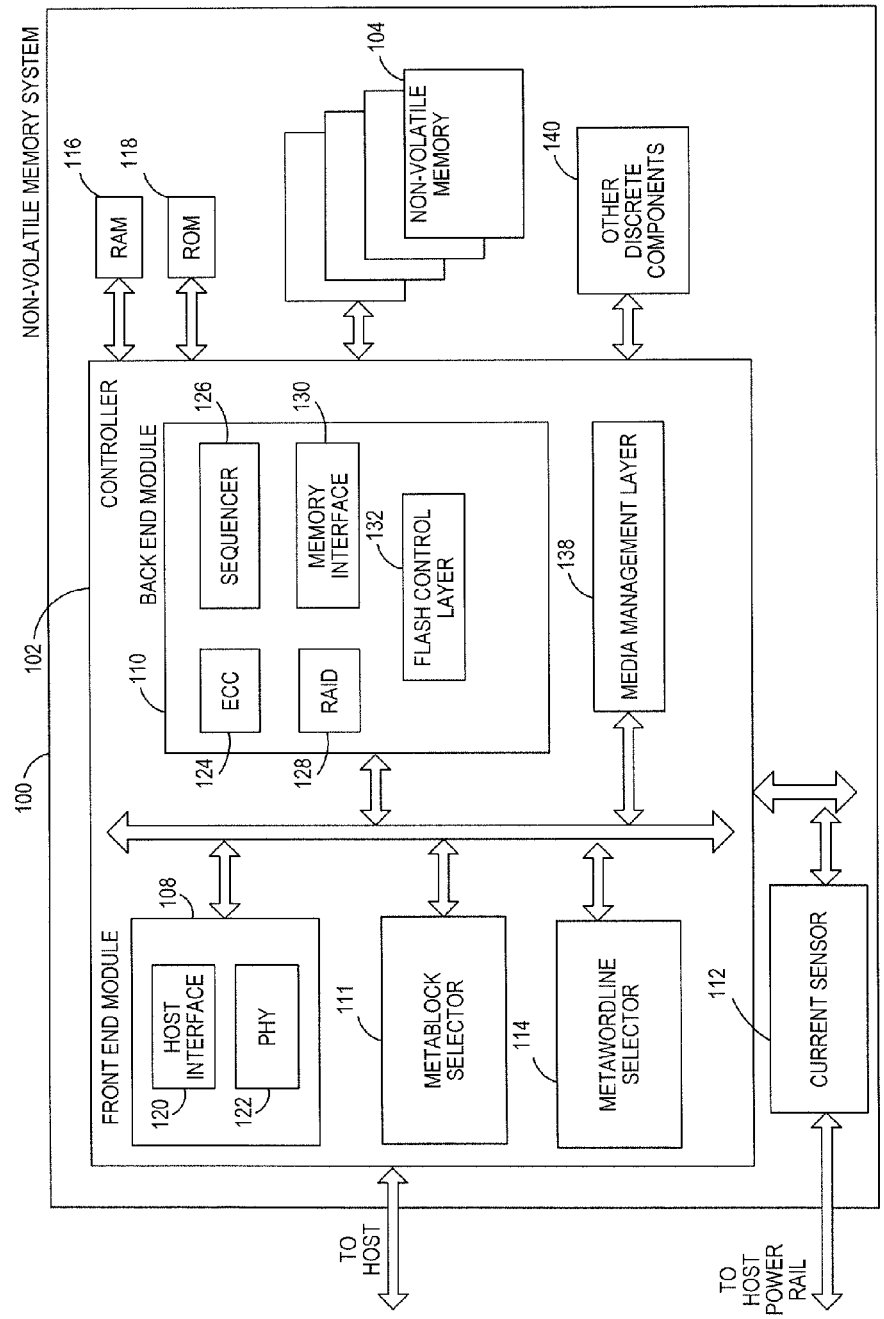
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a metablock selector 111 configured to select a plurality of blocks from several memory planes and/or dies to group together as a metablock. The controller 102 also contains a metawordline selector 114 configured to select a plurality of word lines from several memory blocks to group together as a metawordline. Implementation of the functionality of these modules will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include a current sensor 112 that senses the average current consumed by the memory system 100. The current sensor 112 (which can be a hardware component) can, but does not necessary need to, be used to select blocks for a metablock or word lines for a metawordline, as will be discussed below. The memory system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
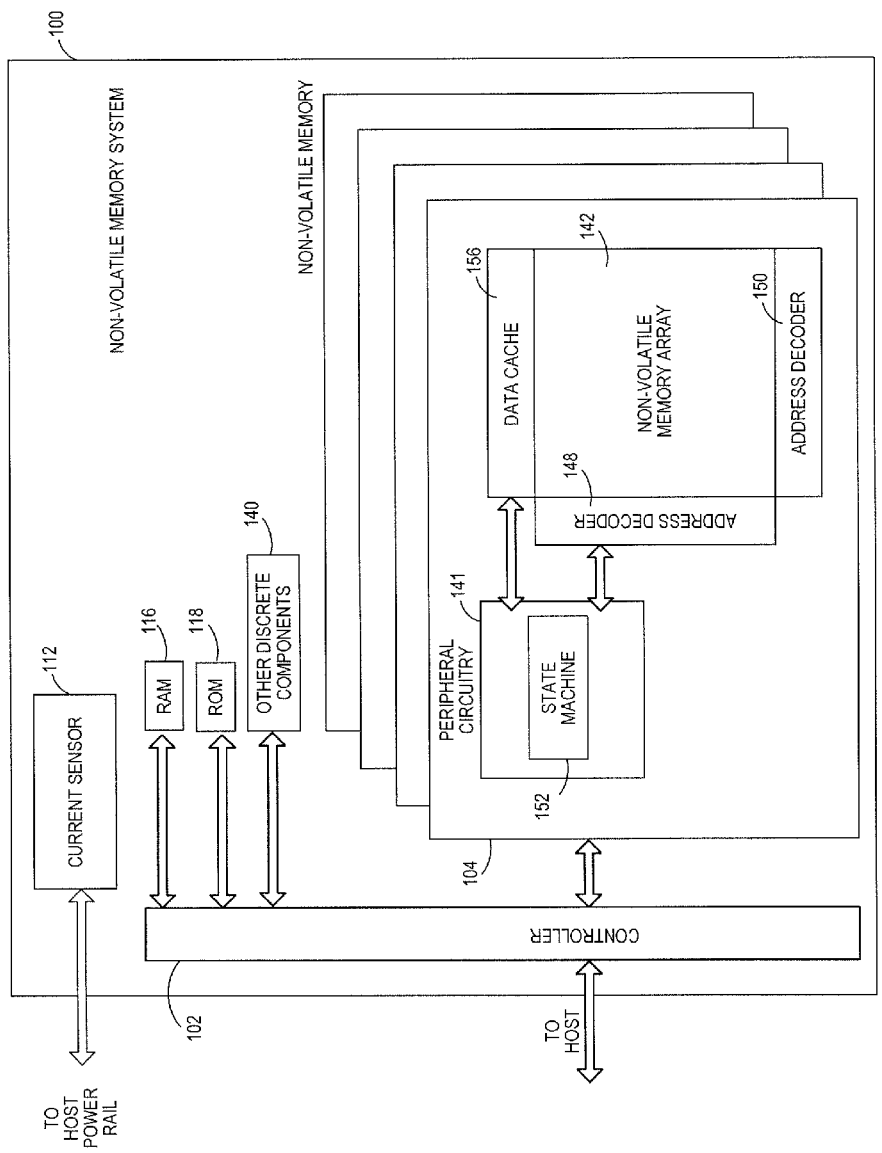
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
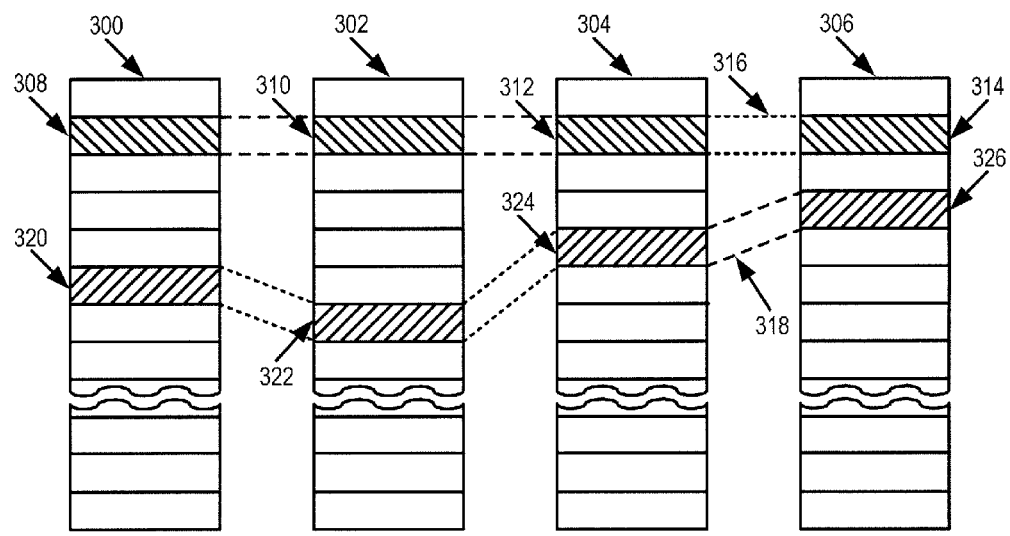
FIG. 3 illustrates an exemplary physical memory organization of a non-volatile memory of an embodiment.

FIG. 3 illustrates an exemplary physical memory organization of the non-volatile memory 104 of an embodiment. As shown in FIG. 3, the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together (e.g., using a table in the controller 102) to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
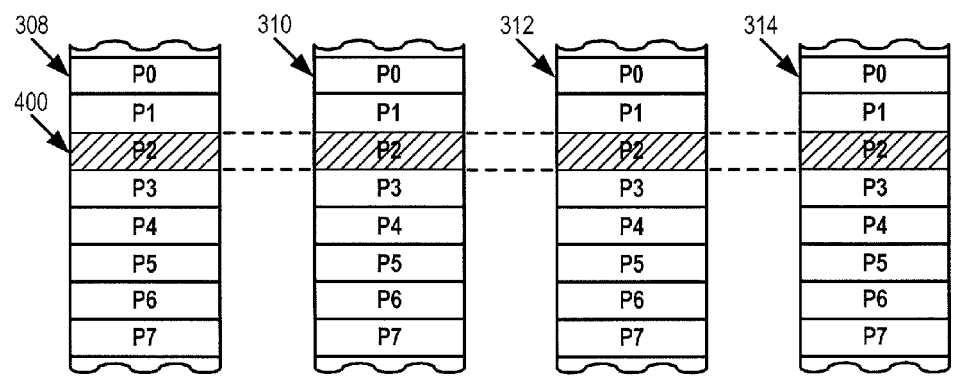
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312, and 314, for example, are each divided into eight pages P0-P7. Alternately, there may be 16, 32, or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is the maximum unit of programming. The blocks disclosed in FIGS. 3-4 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host. The LBAs are then mapped to one or more physical blocks in the non-volatile memory system 100 where the data is physically stored.

The above paragraphs discussed a metablock and a meta-wordline. As another level of granularity, the non-volatile memory system 100 can contain one or more non-volatile memory die, where each die, or group of die, can be managed together as an independent managed set, which is referred to herein as a metadie.

Figure 5:
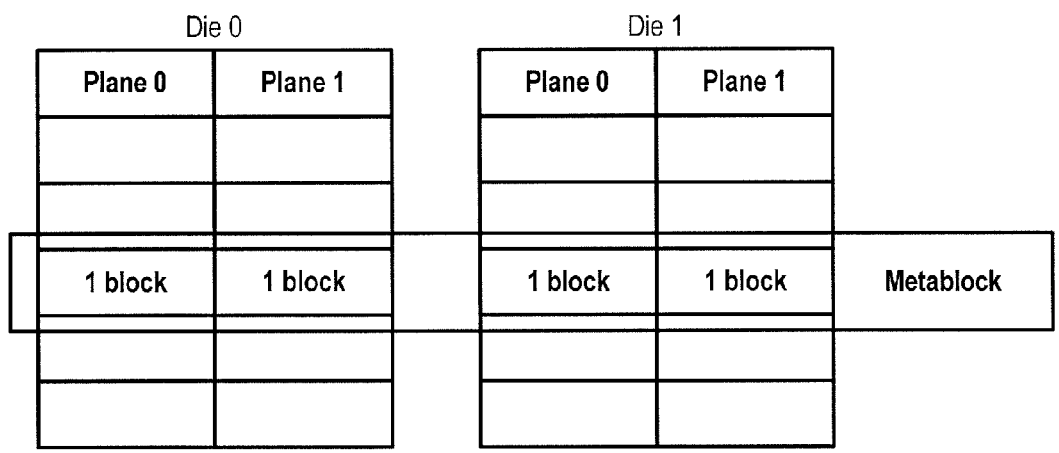
FIG. 5 is an illustration of a metablock of an embodiment in which the blocks in the metablock have the same block address.

Typically, a metablock is formed by grouping together blocks with the same address across multiple dies and/or planes (although different block addresses can be used if there is a bad block that is re-linked to a good block with a different address). This is shown in FIG. 5, with a metablock being formed from four blocks, one from each of two planes of two memory die. In this example, all the blocks in the metablock have the same block address (they are all in the same row). Additional metablocks in this example would be created the same way, with each metablock containing four blocks with the same block address. So, in FIG. 5, the next metablock would be the next row down of four blocks, the next metablock after that would be the next row down of four blocks, etc. Of course, this is just one example. More generally, a page program can be interleaved across multiple NAND pages to optimize write and read performance. Such interleaving can include multiple planes operating in parallel within a NAND die (die page), multiple die pages operate in parallel across NAND dies (meta page), and meta pages selected across different blocks at a meta-block.

Figure 6:
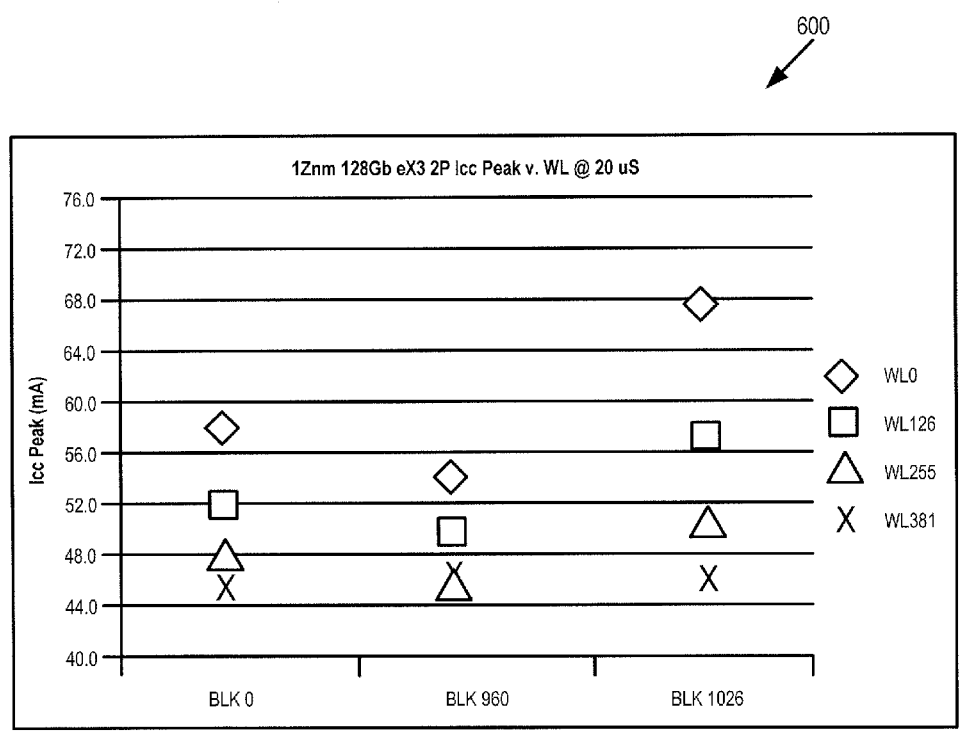
FIG. 6 is a graph of an embodiment showing a correlation between block address and peak current consumption.

A page program consumes current (average, peak), and the inventors have discovered a correlation between block address and peak current consumption, which is shown in the graph 600 in FIG. 6. As shown in this graph 600, for any given word line, the peak current consumption is larger in the last block of memory as compared to the first block of memory. Also, the difference in peak current consumption is large for the first word line as compared to the last word line. It is contemplated that the different in peak current consumption is due to bit line resistance, which is a function of physical block address due to metal running top down from the sense amplifier.

Figure 7:
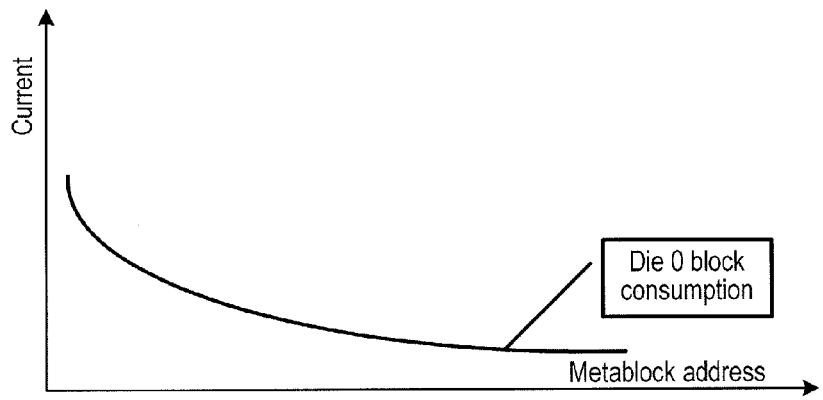
FIG. 7 is a graph of current consumption versus metablock address from Die 0 in a two-die memory system of an embodiment.
Figure 8:
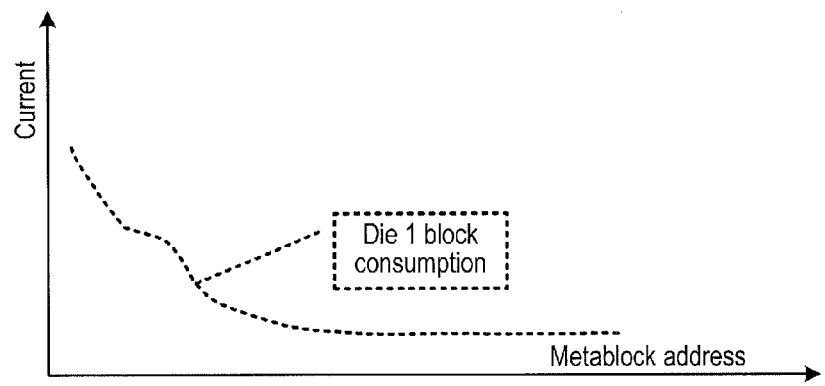
FIG. 8 is a graph of current consumption versus metablock address from Die 1 of an embodiment.
Figure 9:
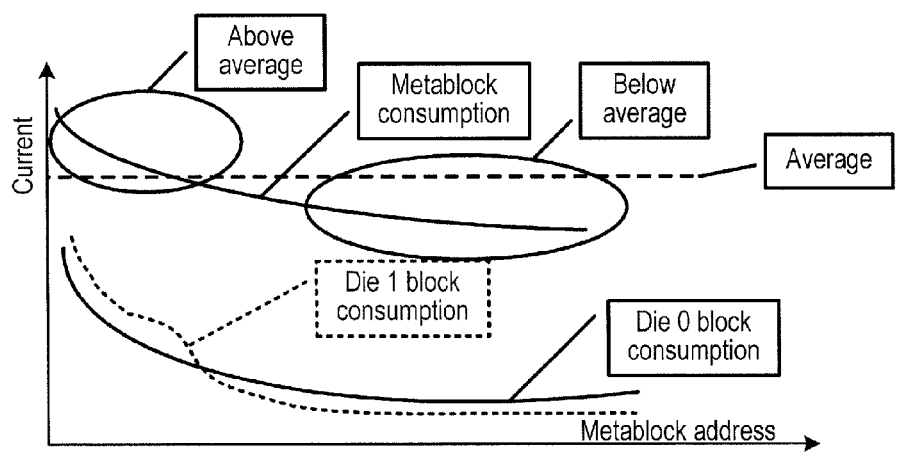
FIG. 9 is a graph of an embodiment showing a sum of the peak current consumption from FIGS. 7 and 8.

This correlation between block address and peak current consumption can cause above and below average current consumption in a memory system that forms metablocks with blocks having the same address in an incremental manner. This is shown in FIGS. 7-9. FIG. 7 is a graph of current consumption versus metablock address from Die 0 in a two-die memory system, and FIG. 8 is a graph of current consumption versus metablock address from Die 1. As shown by these graphs, because of the block address-peak current consumption relationship described above, the lower the metablock address, the higher the current consumption. These current consumptions are additive, and FIG. 9 shown the sum of the graphs in FIGS. 7 and 8. As shown in FIG. 9, forming metablocks from blocks having the same block address results in above-average peak current consumption for metablocks with lower addresses and in below-average peak current consumption for metablocks with higher addresses. When multi-page parallel programming current consumption align, this results in very high compound current with negative effect for regulator and host design. This also results in reduced performance of the memory system 100, as when the peak current is above average, the memory system 100 may need to reduce the number of memory dies that operate in parallel.

The following embodiments take advantage of the correlation between block address and peak current consumption to select metablocks based on current consumption. Specifically, the controller 102 (e.g., the metablock selector 111) in the memory system 100 in this embodiment is configured with hardware and/or software to execute an algorithm that creates a plurality of metablocks, wherein each metablock is created by grouping together blocks with complementary peak current consumption, and programs the metablocks, wherein the blocks grouped together in a metablock are programmed in parallel. Because each of the metablocks has blocks with complementary peak current consumption, each of the metablocks has similar peak current consumption when programmed.

Figure 10:
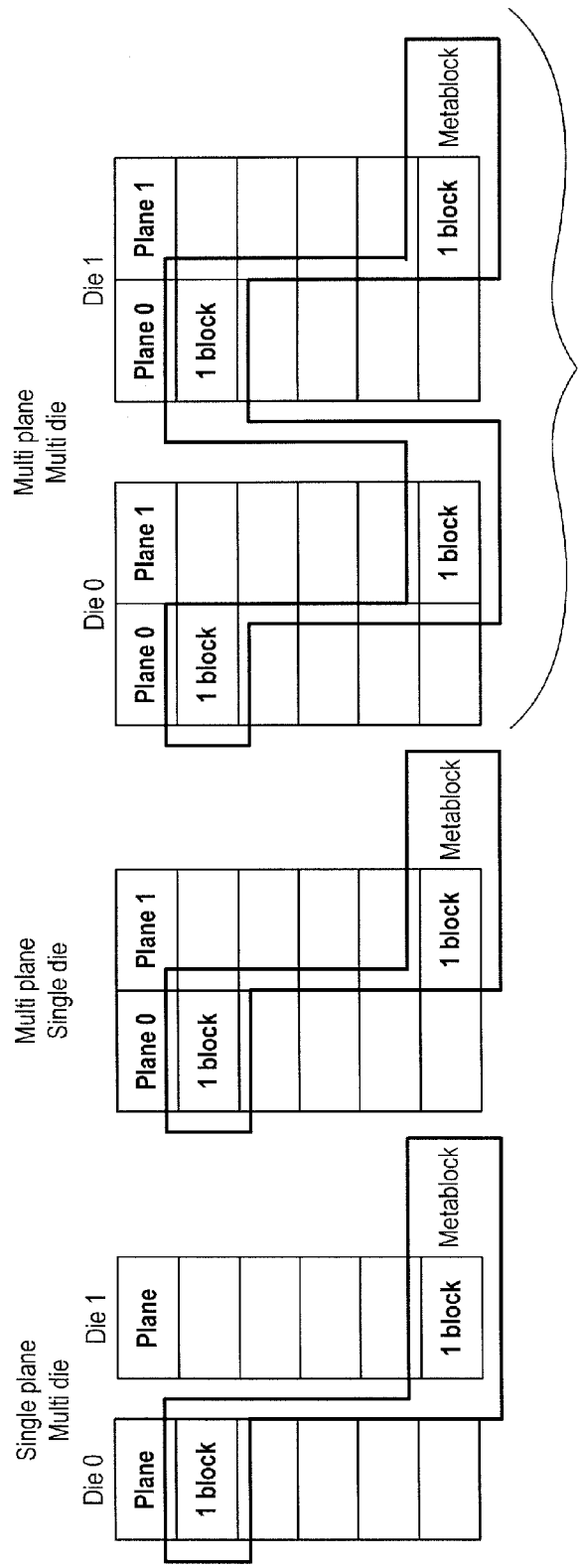
FIG. 10A is an illustration of a metablock of an embodiment formed in a memory comprising a plurality of single-plane memory dies.
FIG. 10B is an illustration of a metablock of an embodiment formed in a memory comprising a multi-plane memory die.
FIG. 10C is an illustration of a metablock of an embodiment formed in a memory comprising a plurality of multi-plane memory dies.

For example, in FIG. 10A, the memory 104 comprises a plurality of single-plane memory dies, and a metablock is created by grouping together blocks with complementary memory addresses from each of the memory dies (i.e., the first block of Die 0 with the last block of Die 1, the second block of Die 0 with the second to last block of Die 1, etc.). In FIG. 10B, the memory 104 comprises a multi-plane memory die, and the metablock is created by grouping together blocks with complementary memory addresses from each of the memory dies. In FIG. 10C, the memory 104 comprises a plurality of multi-plane memory dies, and a metablock is created by grouping together blocks with complementary memory addresses from each of the planes. As shown in these examples, by using complementary memory addresses, all (or, in some cases, almost all) blocks grouped together in a metablock are in different relative locations in their respective planes or dies.

Figure 11:
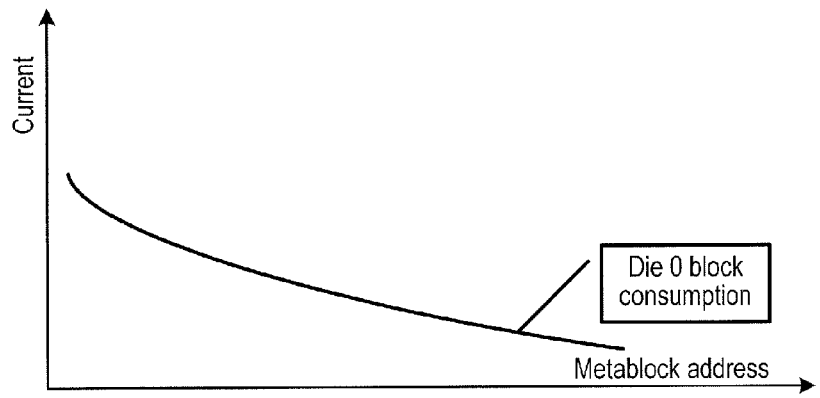
FIG. 11 is a graph of current consumption versus metablock address from Die 0 in a two-die memory system of an embodiment.
Figure 12:
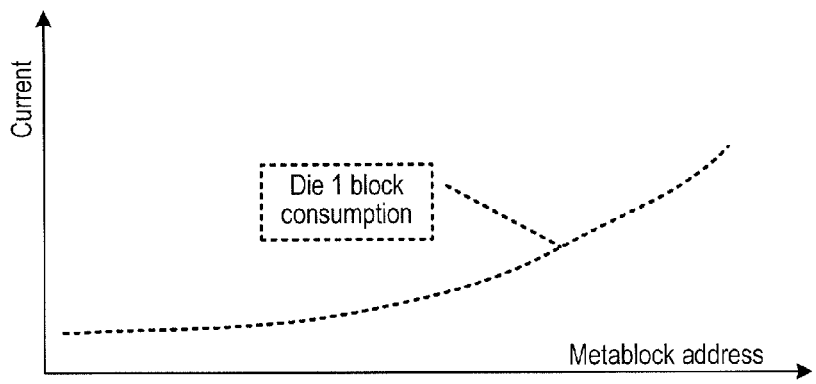
FIG. 12 is a graph of current consumption versus metablock address from Die 1 of an embodiment.
Figure 13:
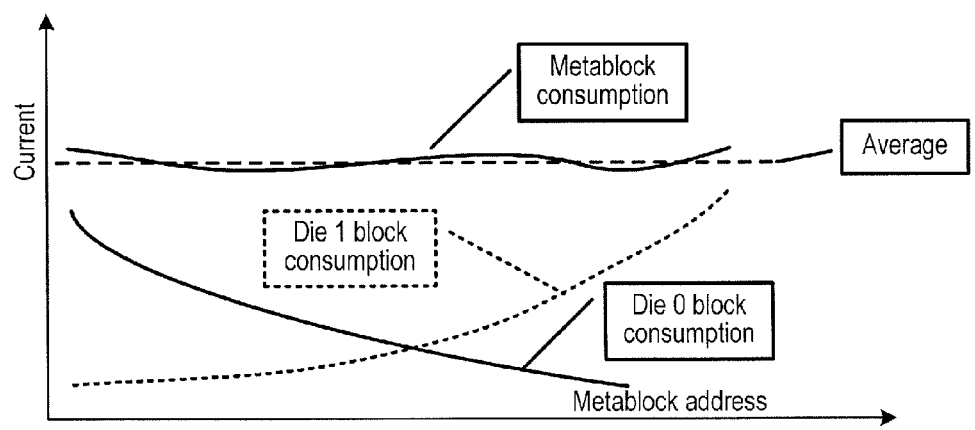
FIG. 13 is a graph showing a sum of the peak current consumption from FIGS. 11 and 12.

By forming metablocks with blocks having complementary peak current consumption, each of the metablocks has similar peak current consumption when programmed, as shown in the graphs in FIGS. 11-13. FIG. 11 is a graph of current consumption versus metablock address from Die 0 in a two-die memory system, and FIG. 12 is a graph of current consumption versus metablock address from Die 1. As shown by these graphs, because of the block address-peak current consumption relationship described above, the lower the metablock address, the higher the peak current consumption. However, because complementary block addresses are used, areas of high peak current consumption in one die correspond to areas of low peak current consumption in another die. These peak current consumptions are additive, and FIG. 13 shows the sum of the graphs in FIGS. 11 and 12. As shown in FIG. 13, forming metablocks from blocks having complementary block addresses results in similar peak current consumption (closely tracking the average in FIG. 13) when the metablocks are programmed. This avoids the problem of areas of lower or higher than average peak current consumption that was shown in FIG. 9, thereby resulting in a more efficient use of the memory system 100 by reducing compound current from a system level. That is, by constructing metablocks based on current consumption, this embodiment can attempt to average out bitline resistance by pairing high bitline resistance blocks with low bitline resistance blocks.

Figure 14:
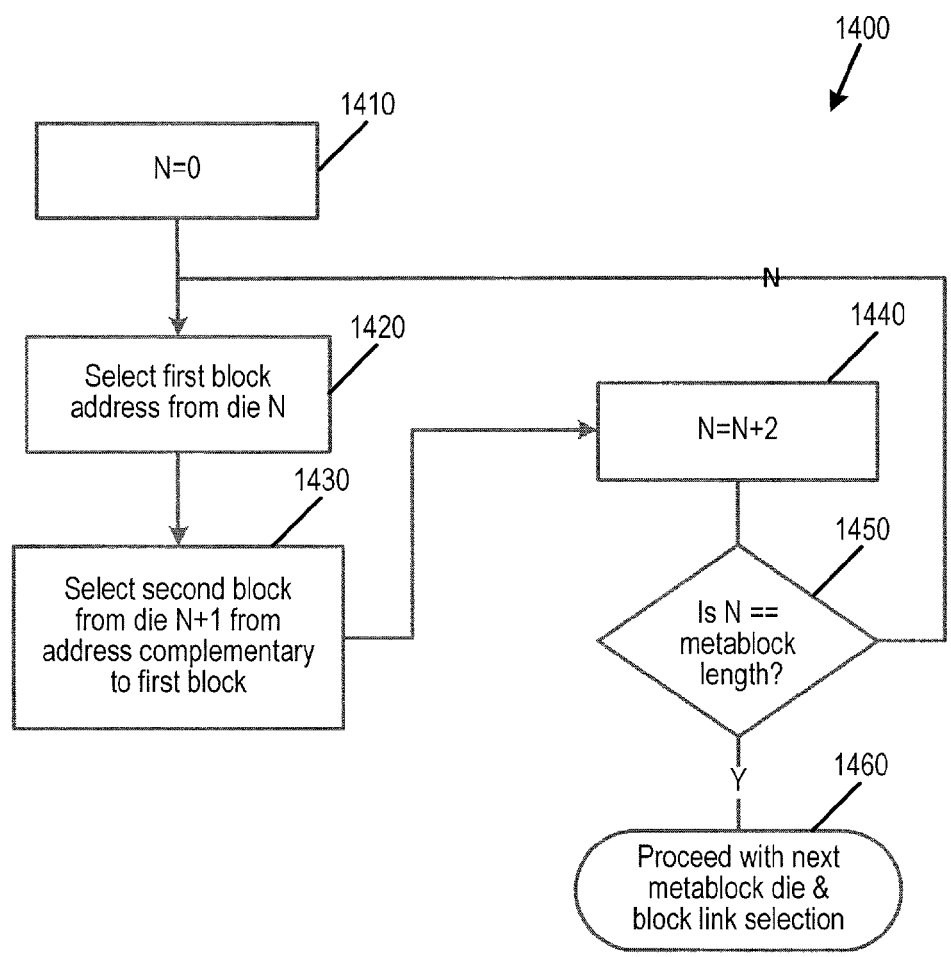
FIG. 14 is a flow chart of a method of an embodiment for creating a metablock.

As mentioned above, the controller 102 (e.g., the metablock selector 111) in the memory system 100 can be configured with any suitable algorithm to implement this embodiment. FIG. 14 is a flow chart 1400 that illustrates one suitable algorithm. Of course, other algorithm s can be used. In this flow chart 1400, the controller 102 first sets N=0 (act 1410). Then, the controller 102 selects the first block address from die N (act 1420). Next, the controller 102 selects a second block from die N+1 from an address complementary to the first block (act 1430). (The selected blocks that form each metablock can be identified in a table in the controller 102). The controller 102 then sets N=N+2 (act 1440). The controller 102 then determines if N is equal to the metablock length (act 1450). If it is, the controller 102 proceeds with the next metablock die and block link selection (act 1460). If it is not, the controller 102 returns to act 1420.

The controller 102 can select blocks to group together in any suitable way. For example, in one embodiment, the controller 102 stores a look-up table 1500 (see FIG. 15) in its internal memory or in the non-volatile memory 104, for example, that links blocks from different planes and/or dies that should be grouped together in a metablock because they have complementary peak current consumption. As another example, the controller 102 can use a formula-based complementary address option (e.g., Block_Address_B=Max_Blocks_Per_Plane−Block_Address_A). As yet another example, the controller 102 can select blocks using an offset address (e.g., a formula-based constant shift address option, such as Block_Address_B=Block_Address_A+Max_Blocks_Per_Plane/2, which can wrap around at Max_Blocks_Per_Plane boundary). As yet another example, the controller 102 can use the peak current sensor 112 to determine the average peak current consumption of the various blocks in memory 104 and choose blocks with complementary peak current consumption "on the fly."

There are many alternatives associated with these embodiments. For example, instead of or in addition to creating a metablock by grouping together blocks based on complementary average peak current consumption, the memory system 100 (e.g., the controller 102 or the metawordline selector 114 in the controller 102) can create a metawordline by grouping together word lines based on complementary average peak current consumption. (In one embodiment, the element programmed in the memory is a word line. A word line may contain multiple pages, and these pages can be programmed all at once (full sequence programming) or page by page.)

Figures 15, 16:
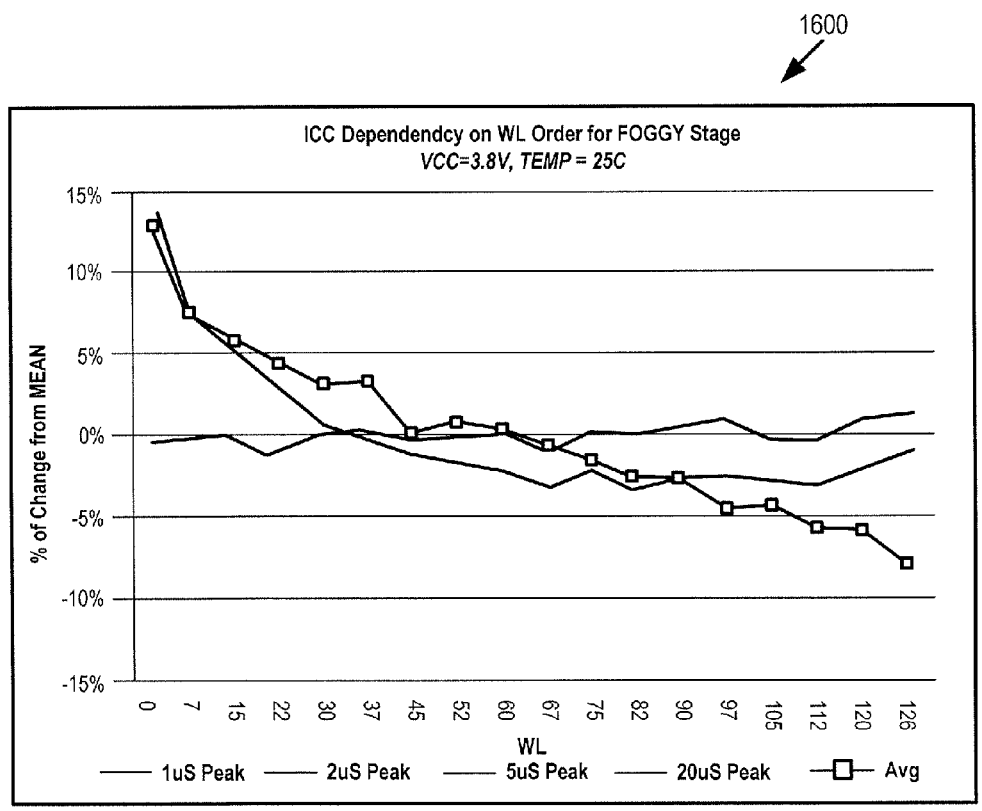
FIG. 15 is a look-up table of an embodiment.
FIG. 16 is a graph of an embodiment showing a correlation between word line address and peak current consumption.
Figure 17:
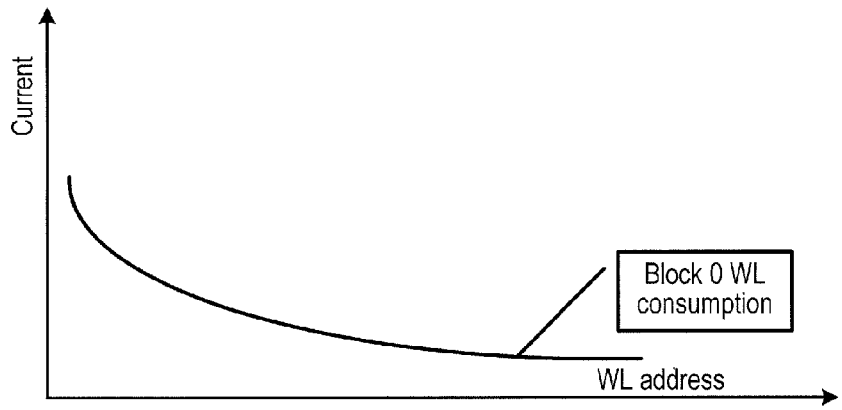
FIG. 17 is a graph of current consumption versus word line address from Block 0 of a memory of an embodiment.
Figure 18:
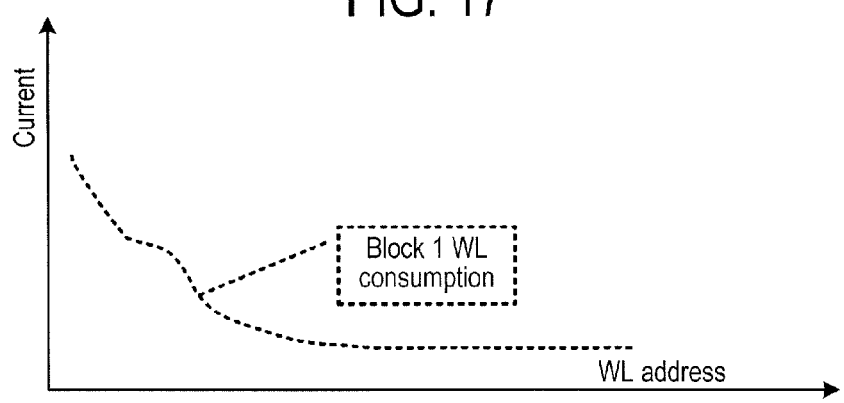
FIG. 18 is a graph of current consumption versus word line address from Block 1 of a memory of an embodiment.
Figure 19:
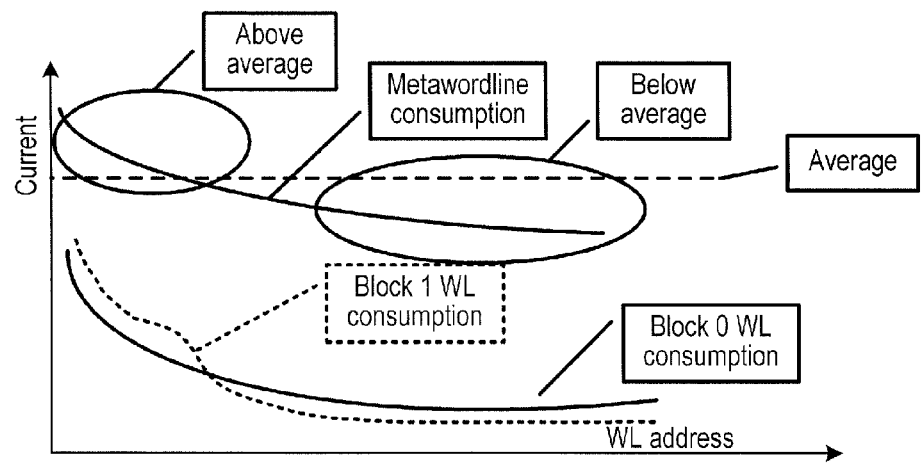
FIG. 19 is a graph of an embodiment showing a sum of the peak current consumption from FIGS. 17 and 18.

As shown in the graph 1600 in FIG. 16, the inventors have also observed a correlation between peak current consumption and location of a word line. More specially, word lines closer to a sense amplifier consume more peak current consumption than word lines farther away from the sense amplifier. As shown in the graphs in FIG. 17-19, a problem similar to that shown in FIG. 7-9 for typical metablock selection also occurs for typical metawordline selection.

Figure 20:
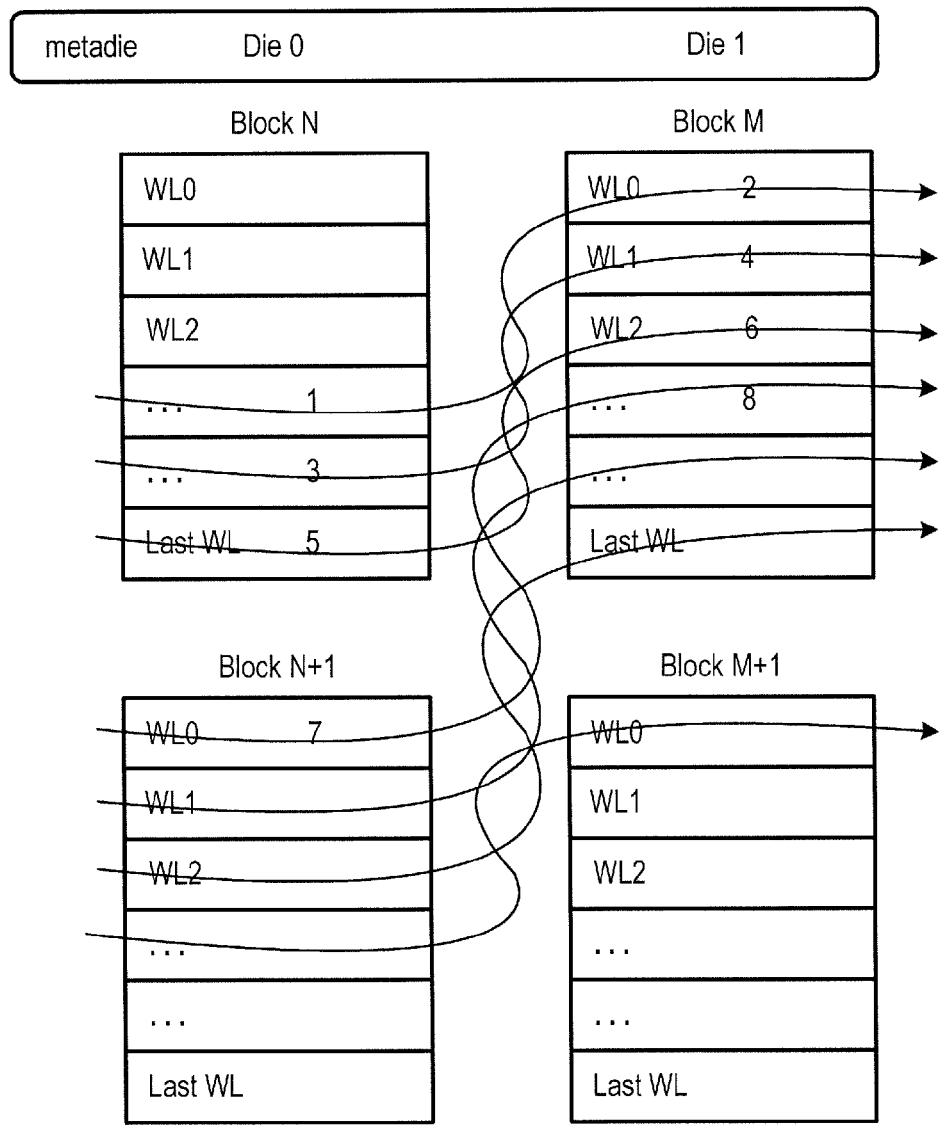
FIG. 20 is an illustration of an embodiment for creating a metawordline.
Figure 21:
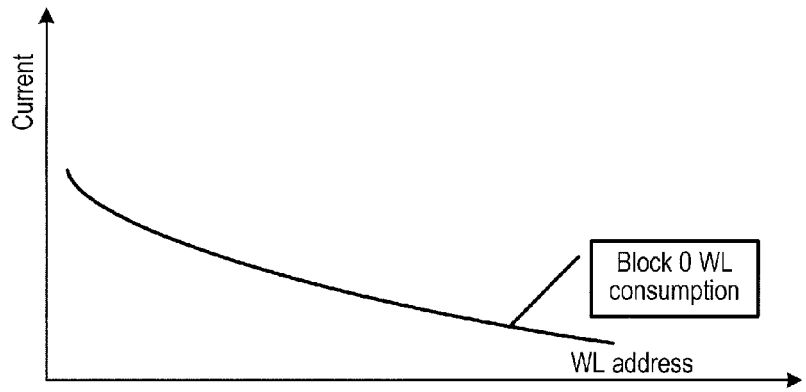
FIG. 21 is a graph of current consumption versus word line address from Block 0 of a memory of an embodiment.
Figure 22:
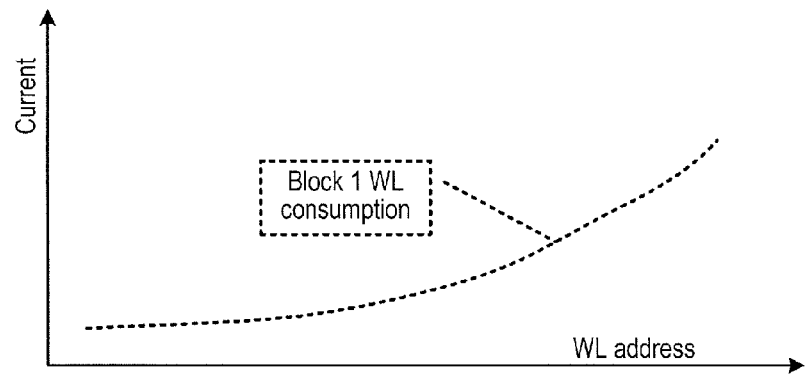
FIG. 22 is a graph of current consumption versus word line address from Block 1 of a memory of an embodiment.
Figure 23:
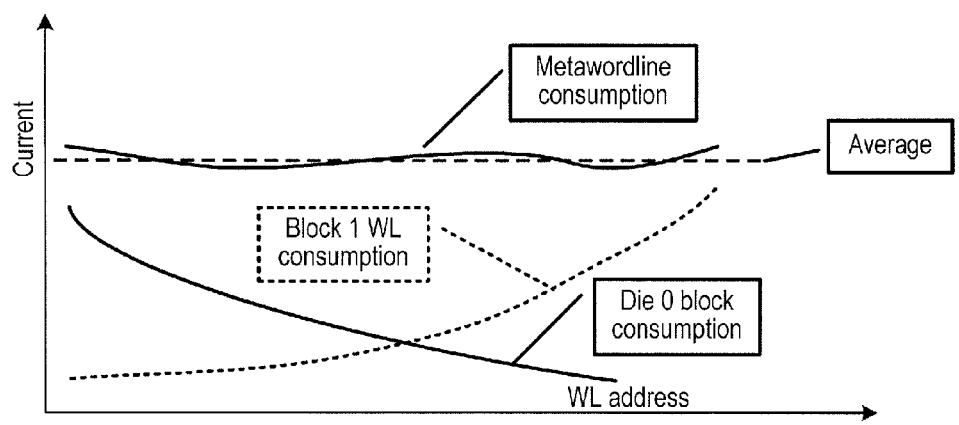
FIG. 23 is a graph of an embodiment showing a sum of the average peak current consumption from FIGS. 21 and 22.

To address the problem, the controller 102 (e.g., the metawordline selector 114) in this embodiment can create a plurality of metawordlines by grouping together word lines with complementary peak current consumption. Because each of the metawordlines has word lines with complementary peak current consumption, each of the metawordlines has similar peak current consumption when programmed. FIG. 20 is an illustration of a metawordline created in such a way across multiple metadies. As shown in FIG. 20, one metawordline is created from word line 3 from Block N and word line 0 from Block M, whereas another metawordline is created from word line 4 from Block N and word line 1 from Block M, etc. As shown in the example, the word lines grouped together in the metawordline are in different relative locations in their respective planes or dies based on the linear correlation function of current versus word line address. This serves as an attempt to average-out word line consumption variation by pairing high-consumption word lines with low-consumption word lines. However, in this embodiment, the programming order is sequential As shown in FIGS. 21-23, by using word lines with complementary peak current consumption, the peak current consumption for each of the metawordlines is about the same, which avoid the problems associated with the traditional approach of creating a metawordline.

The various alternatives and implementations mentioned above with respect to metablocks can be used here with metawordlines. For example, if the memory comprises a plurality of single-plane memory dies, the controller 102 can create a metawordline by grouping together a word line from each of the memory dies. If the memory comprises a multi-plane memory die, the controller 102 can create a metawordline by grouping together a word line from each of the planes. If the memory comprises a plurality of multi-plane memory dies, the controller 102 can create a metawordline by grouping together a word line from each of the planes. Also, in creating a metawordline by grouping together word lines with complementary memory addresses, the controller 102 can use a formula-based constant shift address option (such as WL_Address_B=WL_Address_A+Max_WL_Per_Block/2, that wraps around at Max_WL_Per_Block boundary) or an offset option (e.g., program WL N from die 1 together with WL N+Offset from die 0, where the Offset=Max_WL_Per_Block/2), for example.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for reducing peak current consumption in a memory system, the method comprising:
performing the following in a memory system comprising a memory with a plurality of blocks, wherein each block has a peak current consumption that is correlated with its address, wherein the lower the address, the higher the peak current consumption:
creating a plurality of metablocks, wherein each metablock is created by grouping together blocks with complementary addresses so that a higher peak current consumption of one block is offset by a lower peak current consumption of another block and so that each of the metablocks has a similar peak current consumption when programmed; and
programming the metablocks, wherein the blocks grouped together in a metablock are programmed in parallel.

2. The method of claim 1, wherein the memory comprises a plurality of single-plane memory dies, and wherein a metablock is created by grouping together a block from each of the memory dies.

3. The method of claim 1, wherein the memory comprises a multi-plane memory die, and wherein a metablock is created by grouping together a block from each of the planes.

4. The method of claim 1, wherein the memory comprises a plurality of multi-plane memory dies, and wherein a metablock is created by grouping together a block from each of the planes.

5. The method of claim 1, wherein a metablock is created by grouping together blocks with complementary memory addresses.

6. The method of claim 1, wherein a metablock is created by grouping together blocks using an offset address.

7. The method of claim 1, wherein a metablock is created by grouping together blocks using a look-up table.

8. The method of claim 1, wherein, for at least one metablock, the blocks grouped together in the metablock are in different relative locations in their respective planes or dies.

9. The method of claim 1, wherein the memory is a three-dimensional memory.

10. The method of claim 1, wherein the memory system is embedded in a host.

11. The method of claim 1, wherein the memory system is removably connected to a host.

12. A method for reducing peak current consumption in a memory system, the method comprising:
performing the following in a memory system comprising a memory with a plurality of blocks, each block having a plurality of word lines, wherein each word line has a peak current consumption that is correlated with its location, wherein a first word line has a higher peak current consumption than a last word line:
creating a plurality of metawordlines, wherein each metawordline is created by grouping together word lines with complementary word line locations so that a higher peak current consumption of one word line is offset by a lower peak current consumption of another word line and so that each of the metawordlines has a similar peak current consumption when programmed; and
programming the metawordlines.

13. The method of claim 12, wherein the memory comprises a plurality of single-plane memory dies, and wherein a metawordline is created by grouping together a word line from each of the memory dies.

14. The method of claim 12, wherein the memory comprises a multi-plane memory die, and wherein a metawordline is created by grouping together a word line from each of the planes.

15. The method of claim 12, wherein the memory comprises a plurality of multi-plane memory dies, and wherein a metawordline is created by grouping together a word line from each of the planes.

16. The method of claim 12, wherein a metawordline is created by grouping together word lines with complementary memory addresses.

17. The method of claim 12, wherein a metawordline is created by grouping together word lines using an offset address.

18. The method of claim 12, wherein, for at least one metawordline, the word lines grouped together in the metawordline are in different relative locations in their respective planes or dies.

19. The method of claim 12, wherein the memory is a three-dimensional memory.

20. The method of claim 12, wherein the memory system is embedded in a host.

21. The method of claim 12, wherein the memory system is removably connected to a host.

22. A memory system comprising:
a memory having a plurality of blocks wherein each block has a peak current consumption that is correlated with its address, wherein the lower the address, the higher the peak current consumption, and wherein each block has a plurality of word lines, wherein each word line has a peak current consumption that is correlated with its location, wherein a first word line has a higher peak current consumption than a last word line; and
at least one of the following:
means for creating a plurality of sets of blocks that will have similar peak current consumption when programmed in parallel by, for each set, grouping together blocks with complementary addresses so that a higher peak current consumption of one block is offset by a lower peak current consumption of another block and so that each of the metablocks has a similar peak current consumption when programmed; and
means for creating a plurality of metawordlines that will have similar peak current consumption by, for each metawordline, grouping together word lines with complementary word line locations so that a higher peak current consumption of one word line is offset by a lower peak current consumption of another word line and so that each of the metawordlines has a similar peak current consumption when programmed.

23. The memory system of claim 22, wherein the memory comprises a plurality of single-plane memory dies, and wherein a set of blocks is created by grouping together a block from each of the memory dies.

24. The memory system of claim 22, wherein the memory comprises a multi-plane memory die, and wherein a set of blocks is created by grouping together a block from each of the planes.

25. The memory system of claim 22, wherein the memory comprises a plurality of multi-plane memory dies, and wherein a set of blocks is created by grouping together a block from each of the planes.

26. The memory system of claim 22, wherein a set of blocks is created by performing one of the following: grouping together blocks with complementary memory addresses, grouping together blocks using an offset address, and grouping together blocks using a look-up table.

27. The memory system of claim 22, wherein, for at least one set of blocks, the blocks grouped together in the set are in different relative locations in their respective planes or dies.

28. The memory system of claim 22, wherein the memory comprises a plurality of single-plane memory dies, and wherein a metawordline is created by grouping together a word line from each of the memory dies.

29. The memory system of claim 22, wherein the memory comprises a multi-plane memory die, and wherein a metawordline is created by grouping together a word line from each of the planes.

30. The memory system of claim 22, wherein the memory comprises a plurality of multi-plane memory dies, and wherein a metawordline is created by grouping together a word line from each of the planes.

31. The memory system of claim 22, wherein a metawordline is created by performing one of the following: grouping together word lines with complementary memory addresses and grouping together word lines using an offset address.

32. The memory system of claim 22, wherein, for at least one metawordline, the word lines grouped together in the metawordline are in different relative locations in their respective planes or dies.

33. The memory system of claim 22, wherein the memory is a three-dimensional memory.

34. The memory system of claim 22, wherein the memory system is embedded in a host.

35. The memory system of claim 22, wherein the memory system is removably connected to a host.

\* \* \* \* \*